United States Patent
Lee et al.

(10) Patent No.: US 7,399,459 B2
(45) Date of Patent: Jul. 15, 2008

(54) METHOD FOR MANUFACTURING MESOPOROUS ALUMINA MOLECULAR SIEVE AND ALUMINA NANOTUBE AND USE OF THE ALUMINA NANOTUBE FOR STORAGE OF H2

(75) Inventors: Jae Sung Lee, Pohang (KR); Kyung Hee Lee, Pohang (KR); Hae Jin Kim, Pohang (KR); Hyun Chul Lee, Pohang (KR); Dae Hyun Choo, Pohang (KR)

(73) Assignee: Postech Foundation, Kyungsangbuk-do (KR)

( * ) Notice: Subject to any disclaimer, the term of this patent is extended or adjusted under 35 U.S.C. 154(b) by 116 days.

(21) Appl. No.: 10/523,804

(22) PCT Filed: Oct. 18, 2002

(86) PCT No.: PCT/KR02/01951

§ 371 (c)(1),
(2), (4) Date: Feb. 9, 2005

(87) PCT Pub. No.: WO2004/014799

PCT Pub. Date: Feb. 19, 2004

(65) Prior Publication Data

US 2005/0281734 A1    Dec. 22, 2005

(30) Foreign Application Priority Data

Aug. 12, 2002  (KR) ............... 2002-47508
Aug. 12, 2002  (KR) ............... 2002-47509

(51) Int. Cl.
    *C01F 7/02*    (2006.01)
(52) U.S. Cl. .............. 423/625; 423/111; 206/0.7; 977/811
(58) Field of Classification Search .......... 206/0.7; 423/111, 625; 977/811
    See application file for complete search history.

(56) References Cited

U.S. PATENT DOCUMENTS 5,795,559 A * 8/1998 Pinnavaia et al. ........... 423/702
5,863,515 A * 1/1999 Davis et al. ................ 423/628
6,214,312 B1 * 4/2001 Kolenda et al. ............. 423/628

FOREIGN PATENT DOCUMENTS

JP    2001-205600 A      7/2001
JP    2006-188385 A  *   7/2006

OTHER PUBLICATIONS

W. Deng, et al., "Characterization of mesoporous alumina molecular sieves synthesized by nonionic templating", Microporous and Mesoporous Materials, 2002, pp. 169-177, vol. 52, Elsevier Science Inc.
Gabor Hornyak, et al., "Gold Clusters and Colloids in Alumina Nanotubes", Chem. Eur. J., 1997, pp. 1951-1956, vol. 3 (12).
Hyun Chul Lee, et al., "Synthesis and Characterization of Mesoporous Alumina Molecular Sieves", Theories and Applications of Chem. Eng., Apr. 26, 2002, vol. 8(1), 4 pages.
Jae Sung Lee, et al., "Surfactant driven synthesis of pure and lithium inseted alumina nanotubes", Apr. 19, 2002, 1 page.
Jae Sung Lee, et al., "Surfactant-Driven Synthesis of Individual Alumina Nanotubes and Bundles of Lithium Aluminate Subnanotubules with High Hydrogen Storage Capacity and Lithium Ion Mobility", Symposium for Nano Chemical Processing.
Lin Pu, et al., "Individual Alumina Nanotubes", Angew. Chem. Int. Ed., 2001, pp. 1490-1493, vol. 40 (8).
M. Steinhart, et al., "Polymer Nanotubes by Wetting of Ordered Porous Templates", Science, Jun. 14, 2002, pp. 1997, vol. 296.
Wenzhong Zhang, et al., "Rare earth stabilization of mesoporous alumina molecular sieves assembled through an N *I* pathway", Chem. Commun., 1998, pp. 1185-1186.
Yingjiu Zhang, et al., "Synthesis of alumina nanotubes using carbon nanotubes as templates", Chemical Physics Letters, Jul. 17, 2002, pp. 579-584, vol. 360.
Zou, et al., "Branchy Alumina Nanotubes", Applied Physics Letters, Feb. 11, 2002, pp. 1079-1081, vol. 80(6).

* cited by examiner

*Primary Examiner*—Timothy C. Vanoy
(74) *Attorney, Agent, or Firm*—Rothwell, Figg Ernst & Manbeck, P.C.

(57) ABSTRACT

A mesoporous alumina molecular sieve and a method of manufacturing a mesoporous alumina mesoporous alumina molecular sieve of the invention is produced without using traditionally used additives. Also, because the size and distribution of the pores can be controlled, the molecular sieve can be produced simply and economically, producing molecular sieve with high surface area and thermal stability. Further, a method of manufacturing an alumina nanotube by using a surfactant and a use of the alumina nanotube as a hydrogen storage material are provided.

30 Claims, 5 Drawing Sheets

¹H NMR

METHOD FOR MANUFACTURING MESOPOROUS ALUMINA MOLECULAR SIEVE AND ALUMINA NANOTUBE AND USE OF THE ALUMINA NANOTUBE FOR STORAGE OF H2

CROSS REFERENCE TO RELATED APPLICATION

This application is a 35 U.S.C. § 371 National Phase Entry Application from PCT/KR02/01951, filed Oct. 18, 2002, and designating the U.S.

BACKGROUND OF THE INVENTION

1. Field of the Invention

The present invention relates to a method of manufacturing a mesoporous alumina molecular sieve and an alumina nanotube by using a surfactant and a use of the alumina nanotube as a hydrogen storage material.

2. Description of the Related Art

Generally, alumina is considered an important catalyst and support in industrial processes. A reaction of mesoporous alumina with uniform porosity, high surface area, chemical stability and thermal stability is becoming more valuable than existing alumina with non-uniform pore distribution.

Various surfactants, such as cationic, anionic, neutral and nonionic surfactants have been used in producing alumina with mesopores. Specifically, there have been reports in producing alumina with mesopores and high surface area, by using a nonionic surfactant, a sodium dodecyl sulfate and a long chain carboxylic acid.

However, due to an extremely rapid hydrolysis of alumina in an aqueous solution, it is difficult to synthesize mesoporous alumina molecular sieve using a cationic surfactant. Even in the presence of a surfactant, a hydrated hydroxide in a lamellar form can be produced. Therefore, additives such as triethanoleamine, a hydrolysis inhibitor, are added to prevent rapid hydrolysis in synthesizing mesoporous alumina molecular sieve. Currently, a method of producing mesoporous alumina molecular sieve with high surface area, good thermal stability and simple production method is in demand.

Hitherto, there have been reports on methods of producing mesoporous alumina materials with pore structures of a wormhole or sponge-like motifs by utilizing a supramolecular assembly phenomenon of a surfactant, but there are no reports on producing alumina nanotube by using surfactants.

There have been reports on the reaction of alumina fiber in a nano-structure, by sol-gel process, in which temperature is continuously raised until a predetermined cut-off temperature. There have also been reports on the reaction of alumina nanotube by an electrochemical anodizing method. However, these processes cannot produce a large amount of alumina nanotube.

There has been no report regarding the usage of an alumina nanotube as a hydrogen storage material.

Hydrogen is considered an infinite energy source since hydrogen can be obtained from the earth's water source and it can be recycled back into water form after combustion. Hydrogen is a clean energy source since it produces only water, and not environmental pollutants during combustion. Hydrogen energy can be used in almost all industries, including transportation and electricity generating systems. However, a problem in using the hydrogen energy has been raised due to lack of developments on simple and economical hydrogen storage system.

Hydrogen can be physically stored in a high-pressure chamber by compressing the hydrogen beyond 100 atm. But loading the chamber on a transportational vehicle is extremely dangerous. Also, another physical storage method involves storing the hydrogen at an extremely low temperature, below its boiling point (20.3K). However, although this method allows storing large amount of hydrogen by reducing the storage volume, the cost of equipments used in maintaining the low temperature is too high.

Hydrogen can be chemically stored by using a hydrogen storage alloy. Although such method efficiently stores hydrogen, with repeated cycle of storage and release of hydrogen, impurities may enter and cause deformation of the hydrogen storage alloy, which leads to a deterioration of the hydrogen storage capacity. Also, because a metallic alloy is used as the storage medium, the weight per unit volume increases, thus, it is difficult to load the storage alloy onto a transportation instrument.

Another hydrogen storage method is achieved by forcing adsorption of hydrogen gas on to a solid material. Among such methods, hydrogen storage by carbon nanotube or nanostructured carbon materials shows hydrogen storage efficiency exceeding 10 wt. %. However, these results are difficult to reproduce and many researches are continuing to overcome problems caused by such method.

There are ongoing active researches to develop a hydrogen storage method that reaches at least 6.5 percent by weight of storage efficiency, which is the target hydrogen storage required by the US Department of Energy (DOE), while providing stability and economical efficiency.

SUMMARY OF THE INVENTION

The present invention provides a mesoporous alumina molecular sieve with a high surface area and an outstanding thermal stability, produced in a moderate reaction condition with no other additives than a surfactant. The invention further provides a method of producing the same.

According to an aspect of the present invention, there is provided a method of producing an alumina nanotube that can be mass produced in a moderate reaction condition by using a surfactant.

According to another aspect of the present invention, there is provided a hydrogen storage method that is more efficient, reliable, reproducible, and economical than currently available hydrogen storage methods, by using the alumina nanotube of the foregoing.

An embodiment of the present invention provides a method of producing a mesoporous alumina molecular sieve achieved by mixing a surfactant and an alumina precursor with an organic solvent to produce a mixture, adding water to the mixture, hydrothermal synthesizing the mixture with added water, and then drying and calcinating the mixture to remove residual surfactants.

The alumina precursor to water mole ratio should be 1:0.1 to 10 for the above embodiment.

The alumina precursor to water mole ratio should be 1:1 to 3 for the above embodiment The surfactant to water mole ratio should be 1:0.1 to 10 for the above embodiment.

The surfactant is a cationic surfactant for the above embodiment.

The cationic surfactant is of chemical formula 1 below;

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and x represents a halogen atom, acetate, phosphate, nitrate, or methylsulfate.

The alumina precursor should be an aluminum alkoxide, for example, aluminum-tri-butoxide or an aluminum isopropoxide.

According to an embodiment of the present invention, the organic solvent should be a solvent belonging in an alcoholic group of organic solvents such as 1-butanol, 2-butanol, 1-propanol or 2-propanol.

According to an embodiment of the present invention, the hydrothermal reaction is carried out at 0 to 200° C. for 10 to 100 hours.

Another embodiment of the present invention provides a mesoporous alumina molecular sieve produced by using any the methods described in the foregoing.

Another embodiment of the present invention provides a method of producing alumina nanotube achieved by mixing a surfactant and an alumina precursor with an organic solvent to produce a mixture, adding water to the mixture, hydrothermal synthesizing the mixture with added water, and then drying and calcinating the mixture to remove residual surfactants.

According to an embodiment of the present invention, lithium precursor may be added during the mixing the surfactant and the alumina precursor step or after the drying and calcinating process. The lithium precursor and water is added after the calcinating process to induce ion exchange and further dried and calcinated to produce an alumina nanotube with lithium seed and again adding the lithium precursor by impregnation method followed by calcinating process.

According to another embodiment of the present invention, the lithium precursor may be lithium hydroxide, halide, nitrate, carbonate or sulfate.

According to another embodiment of the present invention, the alumina precursor to the lithium precursor mole fraction is 1:0.1 to 10. Even more preferably 1:1 to 3 mole fraction.

According to another embodiment of the present invention, the alumina precursor to surfactant to water mole ratio is 1:0.1 to 10:0.1 to 10.

According to another embodiment of the present invention, the surfactant should be a cationic surfactant of chemical formula 1 below, an anionic surfactant of chemical formula 2 below, a nonionic surfactant of chemical formula 3 below, or a neutral surfactant of chemical formula 4 below;

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and x represents a halogen atom, acetate, phosphate, nitrate, or methylsulfate.

$R_5$—COOH [Chemical Formula 2]

wherein $R_5$ represents substituted or unsubstituted alkyl group with 1 to 22 carbon atoms.

$CH_3(CH_2)_{30}(CH_2CH_2O)_n$—OH [Chemical Formula 3]

wherein n represents an integer of 1 to 30.

$R_6$—$NH_2$ [Chemical Formula 4]

wherein $R_6$ represents substituted or unsubstituted alkyl group with 8 to 22 carbon atoms.

According to another embodiment, the aluminum precursor should be an aluminum alkoxide, for example, aluminum-tri-butoxide or an aluminum isopropoxide.

According to another embodiment, the hydrothermal reaction should be carried out at 0 to 200° C. for 10 to 100 hours.

According to an embodiment of the present invention, there is provided an alumina nanotube produced by the above methods.

According to another embodiment of the present invention, there is provided a hydrogen storage material produced by inducing adsorption of hydrogen to the aluminum nanotube.

The hydrogen storage material, wherein the adsorption of hydrogen is carried out while maintaining temperature of a container holding the nanotube at 298K to 673K and maintaining the pressure of hydrogen gas at 1 to 10 atmospheric pressure. The hydrogen storage material of above wherein the container holding the nanotube is vacuum treated at 373K to 773K prior to inducing hydrogen adsorption.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention provides a method of producing a mesoporous alumina molecular sieve by using a surfactant and an alumina precursor in a moderate reaction condition.

In the method of producing mesoporous alumina molecular sieve according to the present invention, the hydrolysis rate of an alumina precursor can be controlled simply by using a surfactant and water mixed in a stoichiometric ratio in an alcohol-based organic solvent, even without commonly used additives such as triethanolamine. As a result, the production of hydrate hydroxides, caused by rapid hydrolysis, can be minimized. Also, by manipulating the reaction condition and the length of the surfactant's tail, the size and distribution of the mesopores of the alumina molecular sieve can be controlled.

The mesoporous alumina molecular sieve of the invention is produced by mixing a surfactant and an alumina precursor in an organic solvent to form a mixture. Afterwards, water is slowly added to the mixture, followed by hydrothermal reaction, drying and calcination processes to remove residual surfactants.

As a surfactant, any of the surfactants commonly used in the field may be used. However, preferably, a cationic surfactant is used and more preferably, a cationic surfactant as represented by the following Chemical Formula 1 is used.

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and X represents a halogen atom, acetate, phosphate, nitrate, or methylsulfate.

Examples of the cationic surfactant of the Chemical Formula 1 include $CH_3(CH_2)_{n-1}N(CH_3)_3Br$ (wherein n is 12, 14, 16 or 18) and $CH_3(CH_2)_{n-1}N(CH_3)_3Cl$ (wherein n is 12, 14, 16 or 18). Since the size of a mesopore depends on the length of the cationic surfactant's tail, an appropriate cationic surfactant with desired tail length may be chosen in producing mesopores with a predetermined size.

Preferably, the amount of surfactant is 0.1 to 10 mole per 1 mole of alumina precursor. At an amount of less than 0.1 mole ratio, the surfactant may not effectively form micelle structures and at an amount greater than 10 mole ratio, it is not cost effective to use such surplus amount of surfactants.

As an alumina precursor, any commonly used material in the field may be used. However, preferably, an aluminium alkoxide, such as aluminium tri-sec-butoxide and aluminium isopropoxide is used.

In conventional methods, the alumina precursor such as aluminum alkoxide undergoes rapid hydrolysis, forming hydrated hydroxide so that additives are used to restrain hydrolysis. However, in the present invention, the hydrolysis rate can be controlled simply by adding water, without adding additives.

Preferably, the amount of water for hydrolysis is in a stoichiometric ratio to the alumina precursor. Preferably, water is added slowly into a mixture of an alumina precursor and a surfactant in an organic solvent. Also preferably, the stoichiometric ratio of water to aumina precursor is 0.1 to 10 mole of water per 1 mole of alumina precursor and more preferably 1 to 3 mole of water per 1 mole of alumina precursor. At an amount less than 0.1 mole ratio, an effective hydrolysis of aluminium precursor is unlikely to take place, and at an amount greater than 10 mole ratio, the hydrolysis rate would increases due to large amount of water, making the formation of uniform mesopores difficult.

Preferably, the organic solvent for the invention is an alcohol-based organic solvent, such as 1-butanol, 2-butanol, 1-propanol and 2-propanol.

In the process of the invention for preparing a molecular sieve, the mixture of a surfactant and an aluminium precursor in an organic solvent is added with water and then is subjected to hydrothermal reaction. The purpose of the hydrothermal reaction is to form an alumina mesopore precursor by a dehydration reaction of the mixture. Preferably, temperature during the reaction is 0 to 200° C. and the reaction lasts 10 to 100 hours.

After the hydrothermal reaction, drying and calcination processes are carried out to produce a mesoporous alumina molecular sieve. Preferably, the drying process is carried out at a room temperature or at a sufficiently high temperature to effectively remove un-reacted materials and solvents. The temperature may vary according to the amount of added water and solvents. The purpose of the calcination process is to remove residual surfactants. Preferably, the process is carried out at an inert atmosphere or at an air atmosphere for 1 to 10 hours at 200 to 800° C.

Unlike conventional methods, the present method allows for the production of mesoporous alumina molecular sieve with controlled pore size and pore distribution. Also, because the hydrolysis rate is slow, formation of hydrated hydroxide is suppressed, resulting in homogenized formation of the mesoporous alumina molecular sieve. Further, it is economical since additives are not used.

The invention further includes a method of producing an alumina nanotube by using a surfactant, an alumina precursor and water in a moderate condition, without solvents or additives.

In the present invention, an alumina nanotube is produced by a surfactant and water mixed in a stoichiometic ratio without using solvents or additives. The synthetic reaction is performed at a temperature of approximately 150° C. or lower to encourage simple drying of the mixture and separation of the product.

The invention further includes an alumina nanotube with lithium. The lithium can be added simultaneously or following the alumina nanotube reaction. When adding lithium after nanotube reaction, ion-exchange method or impregnation method is used to incorporate lithium into the alumina nanotube.

The alumina nanotube of the invention weighs less and is better capable of safely storing large amount of hydrogen compared to other hydrogen storage materials that use hydrogen storage alloy or carbon nanotubes. Further, the alumina nanotube of the invention can be applied for use in a secondary lithium battery.

The method of producing the alumina nanotube includes mixing a surfactant and an alumina precursor to create a mixture; adding water to the mixture, followed by hydrothermal reaction and drying and calcinating processes to remove residual surfactants.

As the surfactant for the above process, preferably, a cationic surfactant of Chemical Formula 1, an anionic surfactant of Chemical Formula 2, a non-ionic surfactant of Chemical Formula 3 or a neutral surfactant of Chemical Formula 4, as depicted below are used.

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and X represents a halogen atom, acetate, phosphate, nitrate, or methylsulfate.

[Chemical Formula 2]

wherein $R_5$ represents substituted or unsubstituted alkyl group with 1 to 22 carbon atoms.

[Chemical Formula 3]

wherein n represents an integer of 1 to 30.

[Chemical Formula 4]

wherein $R_6$ represents substituted or unsubstituted alkyl group with 8 to 22 carbon atoms.

Examples of cationic surfactants of Chemical Formula 1 include $CH_3(CH_2)_{n-1}N(CH_3)_3Br$ (n is 12, 14, 16 or 18), $CH_3(CH_2)_{n-1}N(CH_3)_3Cl$ (n is 12, 14, 16 or 18). The size of a mesopore depends on the length of the cationic surfactant's tail. Therefore, a cationic surfactant with an appropriate tail length may be chosen depending on the desired size of the mesopore.

Examples of anionic surfactants of Chemical Formula 2 include $CH_3(CH_2)_{10}COOH$, $CH_3(CH_2)_{12}COOH$ and $CH_3(CH_2)_{14}COOH$ and $CH_3(CH_2)_{16}COOH$.

Examples of nonionic surfactants of Chemical Formula 3 include $CH_3(CH_2)_{15}$—$(CH_2CH_2O)_2$—OH, $CH_3(CH_2)_{15}$—$(CH_2CH_2O)_{10}$—OH and $CH_3(CH_2)_{15}$—$(CH_2CH_2O)_{20}$—OH.

Examples of neutral surfactants of Chemical Formula 4 include $CH_3(CH_2)_{11}NH_2$, $CH_3(CH_2)_{13}NH_2$ and $CH_3(CH_2)_{15}NH_2$.

The surfactants of the foregoing may be used alone or in a combination. Preferably, the amount is 0.1 to 10 mole of the surfactant per 1 mole of the aluminum alkoxide precursor. If the amount of the surfactant is less than 0.1 mole ratio, the surfactant cannot effectively form micelle structures and when the amount is greater than 10 mole ratio, it is not cost effective to use such surplus amount of surfactants.

As an alumina precursor, any commonly used material in the field may be used. However, preferably, an aluminium alkoxide is used. Examples include aluminium tri-sec-butoxide and aluminium isopropoxide.

Such alumina precursor, such as aluminum alkoxide, undergoes rapid hydrolysis, forming a hydrated hydroxide, so that additives are used to restrain hydrolysis. However, in the present invention, the hydrolysis rate can be controlled simply by adding water, without adding additives.

Preferably, the amount of water used in hydrolysis is determined according to the stoichiometric ratio to the alumina precursor. Preferably, water is added slowly into a mixture of an alumina precursor and a surfactant in an organic solvent. Also preferably, the stoichiometric ratio of water to alumina precursor is 0.1 to 10 mole of water per 1 mole of alumina precursor and more preferably 1 to 3 mole of water per 1 mole of alumina precursor. At an amount less than 0.1 mole ratio, it is difficult for an effective hydrolysis of aluminium precursor to take place, and when the amount is greater than 10 mole ratio, the rate of hydrolysis increases due to large amount of water, making the formation of uniform mesopores difficult.

In the process of the invention for preparing a molecular sieve, the mixture of a surfactant and an aluminium precursor in an organic solvent is added with water and then subjected to hydrothermal reaction. The purpose of the hydrothermal reaction is to form an alumina mesopore precursor from the dehydration reaction of the mixture containing the surfactant, aluminium precursor and the organic solvent. Preferably, the temperature during the reaction is 0 to 200° C. and the reaction lasts 10 to 100 hours.

After the hydrothermal reaction, drying and calcination processes are carried out to produce a mesoporous alumina molecular sieve. Preferably, the drying process is done at a room temperature or at a sufficiently high temperature to effectively remove un-reacted materials and solvents. The temperature may vary according to the amount of added water and solvents. The purpose of the calcination process is to remove residual surfactants. Preferably, the process is done at an inert atmosphere or at an air atmosphere for 1 to 10 hours at 200 to 800° C.

The invention further includes an alumina nanotube with lithium. The lithium can be added simultaneously or after the alumina nanotube reaction. When adding lithium after the alumina nanotube reaction, ion-exchange method or impregnation method is used to incorporate lithium into the alumina nanotube.

Lithium can be effectively added during nanotube reaction by adding lithium precursor while the surfactant, alumina precursor and water are being mixed. Preferably, the amount of lithium precursor is 0.1 to 10 mole per 1 mole of alumina precursor and more preferably, 1 to 3 mole per 1 mole of alumina precursor. Also preferably, the lithium precursor is lithium hydroxide, halide, nitrate, carbonate or sulfate. If the amount is less than 0.1 mole ratio, an effective chemical bonding between lithium precursor and alumina precursor is difficult to obtain, and at an amount of greater than 10 mole ratio, an effective chemical reaction may not occur because of the small amount of aluminium precursor compared to the lithium precursor.

Besides adding the lithium precursor during the alumina nanotube reaction as described in the foregoing, lithium precursor may be added after the alumina nanotube has been produced.

In order to add lithium precursor to a pre-produced alumina nanotube, a lithium precursor is added to impose ion exchange of the lithium precursor in the aqueous solution of the nanotube, followed by drying and calcinating processes to create an alumina nanotube with a lithium seed. Afterwards, another impregnation process with lithium precursor is imposed to produce alumina nanotube with lithium.

A radical as defined in the invention to be a substituted or unsubstituted alkyl group with 1 to 4 carbon atoms includes such radicals in linear or branched forms, and one or more of the radicals may be substituted with a halogen atom, hydroxy group, carboxyl group, cyano group or amino group. Examples of such radicals include methyl, ethyl, n-propyl, isopropy, n-butyl, isobutyl, sec-butyl and t-butyl.

A radical as defined in the invention to be a substituted or unsubstituted alkyl group with 1 to 22 carbon atoms includes such radicals in linear or branched forms, and one or more of the radicals may be substituted with a halogen atom, hydroxy group, carboxyl group, cyano group or amino group. Examples of such radicals include methyl, ethyl, n-propyl, isopropy, n-butyl, isobutyl, sec-butyl, t-butyl, pentyl, isoamyl, hexyl, octyl, isooctyl, nonyl, lauryl, myristyl, cetyl and stearyl.

A radical as defined in the invention to be a substituted or unsubstituted alkyl group with 8 to 22 carbon atoms includes such radicals in linear or branched forms, and one or more of the radicals may be substituted with a halogen atom, hydroxy group, carboxyl group, cyano group or amino group. Examples of such radicals include octyl, isooctyl, nonyl, lauryl, myristyl, cetyl and stearyl.

The invention will now be described more fully with reference to examples. This invention may, however, be embodied in many different forms and should not be construed as being limited to the embodiments set forth herein; rather, these embodiments are provided so that this disclosure will be thorough and complete, and will fully convey the concept of the invention to those skilled in the art.

EXAMPLES

Example 1-1 to 1-5

The method of synthesizing a mesoporous alumina molecular sieve is as follows.

Figure 7:
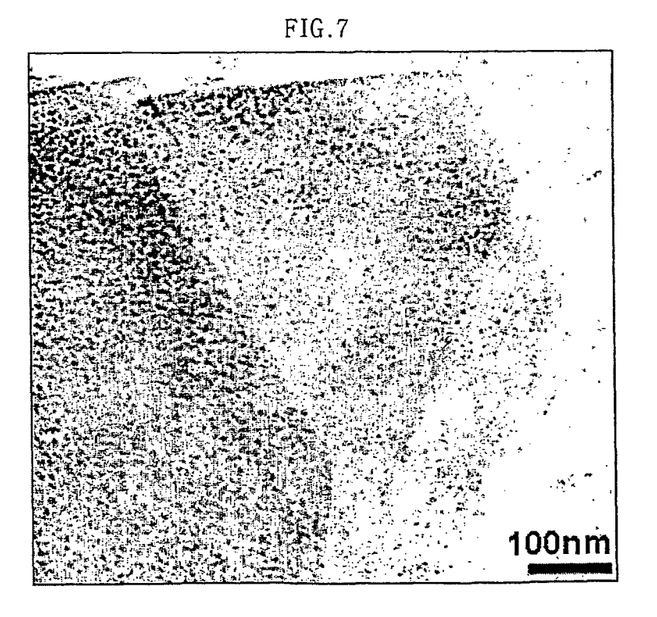
FIG. 7 is a TEM photograph of mesoporous alumina molecular sieve produced according to Example 1-5 of the invention.

In 70 ml of 1-butanol, $CH_3(CH_2)_{n-1}N(CH_3)_3$—Br (n=12, 14 or 16) as a cationic surfactant and aluminum tri-sec-butoxide as a alumina precursor as listed in Table 1 were mixed under stirring until a uniform mixture is obtained. To the mixture, distilled water was slowly added. The mole ratio of the mixture was 0.5:1:2 for surfactant:aluminum tri-sec-butoxide:distilled water, respectively. After the mixture was stirred until a uniform mixture was obtained, the obtained mixture in a gel form was moved into a Teflon-lined autoclave container, and hydrothermal reaction was carried out for 24 hours at temperatures listed in Table 1. Afterwards, the product was washed with ethanol several times, the product was dried at room temperature for 16 hours and followed by another 5 hours of drying at 110° C. Then, a calcination process was carried out at 500° C. and at atmospheric pressure for 4 hours to remove any residual surfactant, thereby producing the mesoporous alumina molecular sieve. The mesopore distribution is shown in Table 1. Also, the TEM photograph of the mesoporous alumina molecular sieve in Examples 1-5 is shown in FIG. 7. FIG. 7 shows that a comparatively uniform mesopore has a similar structure as a worm-hole distribution.

The BET surface area and BJH pore size of the mesoporous molecular sieves, determined by nitrogen isotherm absorption test, were dependent upon reaction temperature and the tail length of the surfactants. As reaction temperature was raised from room temperature to 423K, the pore size decreased from 7.2 nm to 4.8 nm, and the pore distribution became narrower. Also, the pore size increased with an increase in the tail length of the surfactants. Therefore, it can be inferred that by manipulating the condition during reaction process, the size of the pore can be controlled.

Figure 8:
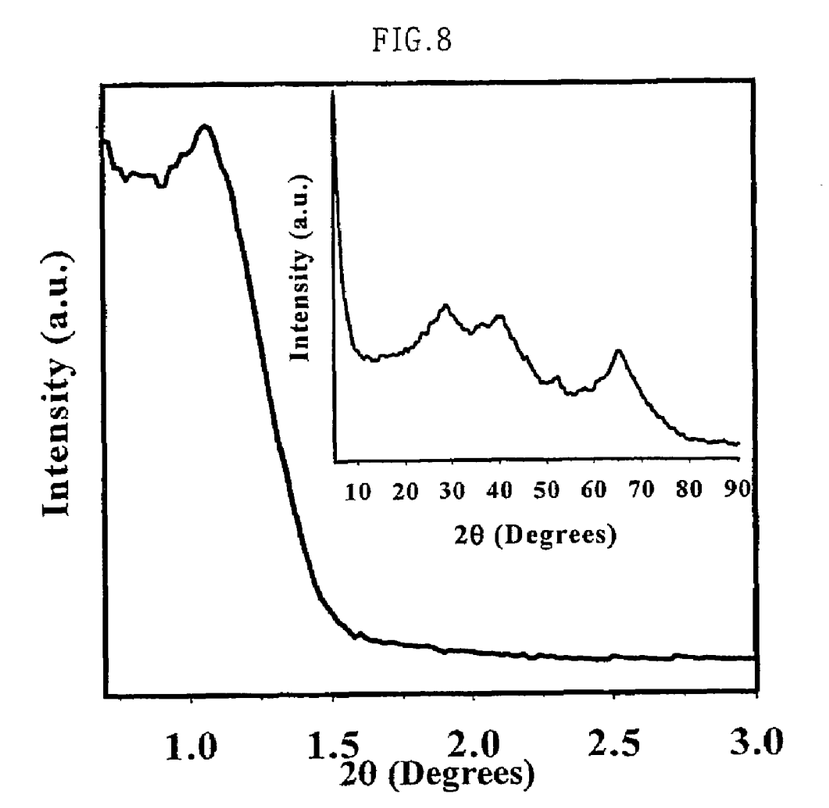
FIG. 8 is a graph depicting the X-ray diffraction pattern of the mesoporous alumina molecular sieve produced according to Example 1-4 of the invention.

FIG. 8 illustrates the representative small angle and wide angle X-ray diffraction patterns of the mesoporous alumina molecular sieve produced according to Example 1-4 of the invention. XRD pattern of the small angle, which is known to be closely related to the distribution of the pores of the mesoprous alumina, showed only a single peak, which is an indication of irregular mesopore structure. The wide angle X-ray diffraction analysis indicates the correspondence between the mesoporous alumina molecular sieves and the bulk gamma-alumina peaks. These results indicate that the mesoporous alumina molecular sieves of Example 1-4 are composed of oxidized aluminium or aluminium oxyhydroxide with low crystallinity.

The pore structure of the mesoporous alumina molecular sieve of Example 1-4 showed high uniformity, however, clear repetitive arrangements of the pore structures were not shown. Such irregular pore connectivity is considered to be similar to a worm-hole or a sponge like structure, often found in the mesopores of silica alumina. Although a consistent arrangement over a wide range is not shown, as the small angle X-ray diffraction analysis illustrates, a single strong peak indicates that each of the pore channels possesses consistent distribution.

High resolution NMR allows for a structural analysis of aluminum in a mesoporous alumina molecular sieve. For the present invention, $^{27}Al$ MAS (Magic angle spinning), CPMAS (Cross Polarization Magic Angle Spinning), MQMAS (Multiple Quantum Magic Angle Spinning) NMR experiments were performed for the molecular sieves of Examples 1-1 to 1-5, in regards to each of the tail lengths. The results showed two clear resolution $^{27}Al$ NMR peaks, which indicate the presence of nonequivalent magnetic Al centers. The two peaks are known to represent aluminum sites with tetrahedral and octahedral structures, respectively. Around 33 ppm, a weak NMR peak was observed, and this was a 5-coordinated aluminum site. $^{27}Al$ CPMAS (Cross Polarization Magic Angle Spinning) NMR showed three clear peaks at 72, 33 and −1 ppm. This is due to the increase in the center of the 5-coordinated aluminum due to a cross polarization effect. In other words, due to magnetization transfer from proton to aluminum, the corresponding NMR peak of 5-coordinated

TABLE 1

| | Surfactant $CH_3(CH_2)_{n-1}N(CH_3)_3$—Br | Temp. (□) | Time (h) | BET Specific Surface area ($m^2$/g) | BJH Pore size (nm) |
|---|---|---|---|---|---|
| Example 1-1 | n = 12 | 100 | 24 | 429 | 4.5 |
| Example 1-2 | n = 14 | 100 | 24 | 241 | 6.5 |
| Example 1-3 | n = 16 | RT | 24 | 310 | 7.2 |
| Example 1-4 | n = 16 | 100 | 24 | 337 | 6.7 |
| Example 1-5 | N = 16 | 150 | 24 | 401 | 4.8 |

As Table 1 illustrates, the surface areas of mesoporous alumina molecular sieves range between 241 to 429 $m^2$/g.

aluminum increased. There had been reports that such 5-coordinated aluminum center can function as a Lewis acid.

Therefore, it can be assumed that the 5-coordinated aluminum center in the molecular sieve synthesized by using a cationic surfactant contains an electron receiving group.

The mesoporous alumina molecular sieve synthesized according to the invention has similar structure to a wormhole structure while having a high surface area, thermal stability and different coordinated aluminum sites than conventional molecular sieves.

Examples 2-1 to 2-5

Production of Alumina Nanotube

As illustrated in Table 2, $CH_3(CH_2)_{n-1}N(CH_3)_3$—Br (N=12, 14 or 16), as a cationic surfactant, and aluminum tri-secondary-butoxide as an alumina precursor were mixed under stirring until an uniform solution was obtained. Distilled water was slowly added to the solution. The mole ratio of such solution was 0.5:1:2 for surfactant:aluminum tri-secondary-butoxide:distilled water, respectively. After the solution was further stirred until it became uniform, the resulting solution, in a gel form, was moved into a Teflon-lined autoclave container, and was subjected to hydrothermal reaction for 24 hours at temperatures listed in Table 1. Afterwards, the product was washed with ethanol several times, and then the product was dried at room temperature for 16 hours and for another 5 hours at 110° C. Then, after 4 hours of calcinating process at 500° C. and at atmospheric pressure to remove residual surfactant, an alumina nanotube composed of oxidized aluminum was obtained.

The results in Table 3 show that when surfactants with same tail length of carbon chain were used, the alumina nanotube of the present invention showed higher surface area than other conventionally used commercial bulk alumina.

Examples 2-10 to 2-13

Production of Alumina Nanotube with Lithium

In order to produce an alumina nanotube with lithium, a cationic surfactant ($CH3(CH2)n-_1N(CH_3)_3Br$, n=16) or nonionic surfactant (—$CH_3(CH_2)_{n-1}$—$C_6H_5$—$(PEO)_x$—OH, n=8, x=8) as a surfactant, aluminum tri-secondary-butoxide as aluminum precursor, and lithium hydroxide, lithium chloride or lithium carbonate as lithium precursor, and water as a solvent were mixed according to Table 4. The mole ratio was 0.5:1:1:2 for surfactant:aluminum precursor:lithium precursor:water, respectively. After the mixture was stirred until a uniform solution was obtained, the obtained solution was poured into a Teflon-lined autoclave container, and was subjected to hydrothermal reaction for 72 hours at 423K. Afterwards, ethanol was used to wash the product several times, and the product was dried at 383K. Then, after 4 hours of calcinating process at 773K and at atmospheric pressure to remove residual surfactant, an alumina nanotube with lithium was obtained.

Table 4 illustrates the reaction conditions (reaction temperature, type of surfactant, type of lithium precursor) for the production of alumina nanotubes with lithium.

|  | Surfactant(Cationic) $(CH_3(CH_2)_{n-1}N(CH_3)_3$—Br) | Temp. (□) | Time (h) | BET Specific Surface Area $(m^2/g)$ | BJH Pore size (nm) |
|---|---|---|---|---|---|
| Example 1-1 | n = 12 | 100 | 72 | 256 | 3.0 |
| Example 2-2 | n = 14 | 100 | 72 | 328 | 3.8 |
| Example 2-3 | n = 16 | RT | 72 | 293 | 3.4 |
| Example 2-4 | n = 16 | 100 | 72 | 389 | 3.6 |
| Example 2-5 | n = 16 | 150 | 72 | 385 | 3.8 |

The results in Table 2 indicate that with an increase in the carbon chain in the tail of the surfactants and temperature, the pore size and the surface area increase.

Examples 2-6 to 2-9

Production of Alumina Nanotube

Various surfactants (cationic, anionic, nonionic, neutral) with 16 carbon chains in the tail length were used to produce alumina nanotubes. The mixing ratio was same as for the examples 2-1 to 2-5, in that 0.5:1:2 for surfactant, aluminum tri-secondary-butoxide, respectively, were used.

Figure 1:
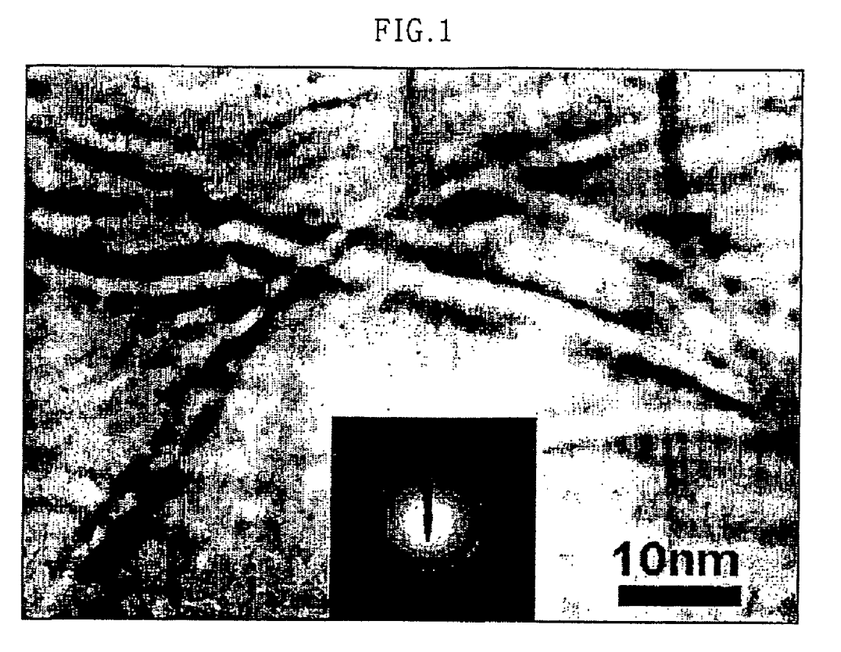
FIG. 1 is a TEM photograph and SADP pattern of an alumina nanotube produced according to Example 2-6 of the invention.

FIG. 1 represents the TEM photograph and SADP pattern of the alumina nanotube produced by Example 2-6

TABLE 3

|  | Surfactant | Temp. (□) | Time (h) | BET Specific Surface Area $(m^2/g)$ | BJH Pore Size (nm) |
|---|---|---|---|---|---|
| Example 2-6 | $CH_3(CH_2)_{15}N(CH_3)_3$—Br | 150 | 72 | 385 | 3.8 |
| Example 2-7 | $CH_3(CH_2)_{14}COOH$ | 150 | 72 | 282 | 2.8 |
| Example 2-8 | $CH_3(CH_2)_{15}NH_2$ | 150 | 72 | 300 | 2.8 |
| Example 2-9 | $CH_3(CH_2)_{15}$—$(PEO)_2$—OH | 150 | 72 | 445 | 3.0 |

TABLE 4

| | Lithium Precursor | Surfactant | Temp. (K) | Time (h) | BET Specific Surface Area ($m^2/g$) | BJH Pore Size (nm) |
|---|---|---|---|---|---|---|
| Example 2-10 | LiOH | $CH_3(CH_2)_{15}N(CH_3)_3$—Br | 423 | 72 | 128 | 4.0 |
| Example 2-11 | LiCl | $CH_3(CH_2)_{15}N(CH_3)_3$—Br | 423 | 72 | 234 | 6.2 |
| Example 2-12 | $Li_2CO_3$ | $CH_3(CH_2)_{15}N(CH_3)_3$—Br | 423 | 72 | 137 | 10.0 |
| Example 2-13 | LiOH | $CH_3(CH_2)_7$—$C_6H_5$—$(PEO)_8$—OH | 423 | 72 | 136 | 3.0 |

Figure 2A:
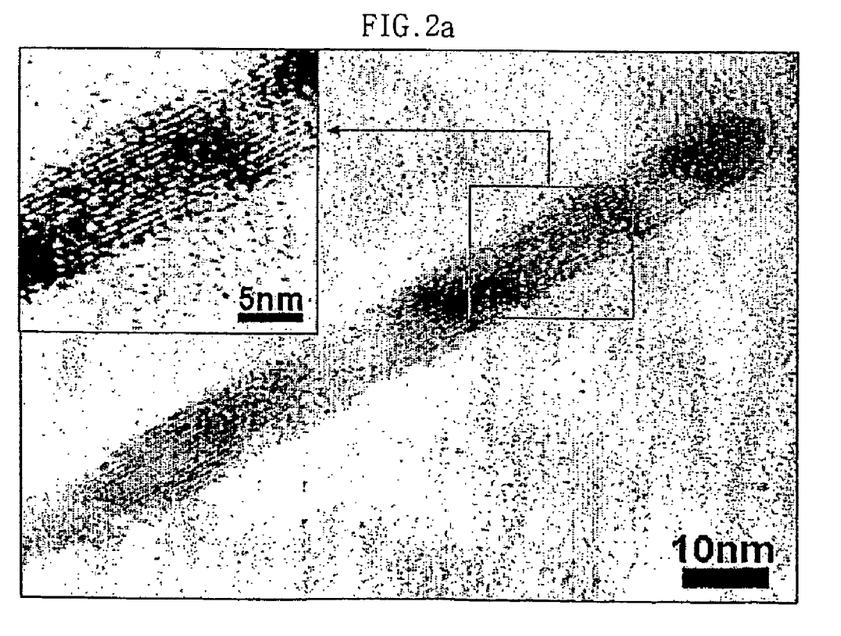
FIG. 2a are HR-TEM photographs of an alumina nanotube with lithium, produced according to Example 2-10 of the invention FIG. 2b are TEM photographs of an alumina nanotube with lithium, produced according to Example 2-10 of the invention.

FIG. 2a represents HR-TEM photographs of an alumina nanotube with lithium, produced according to Example 2-10 of the invention.

Figure 2B:
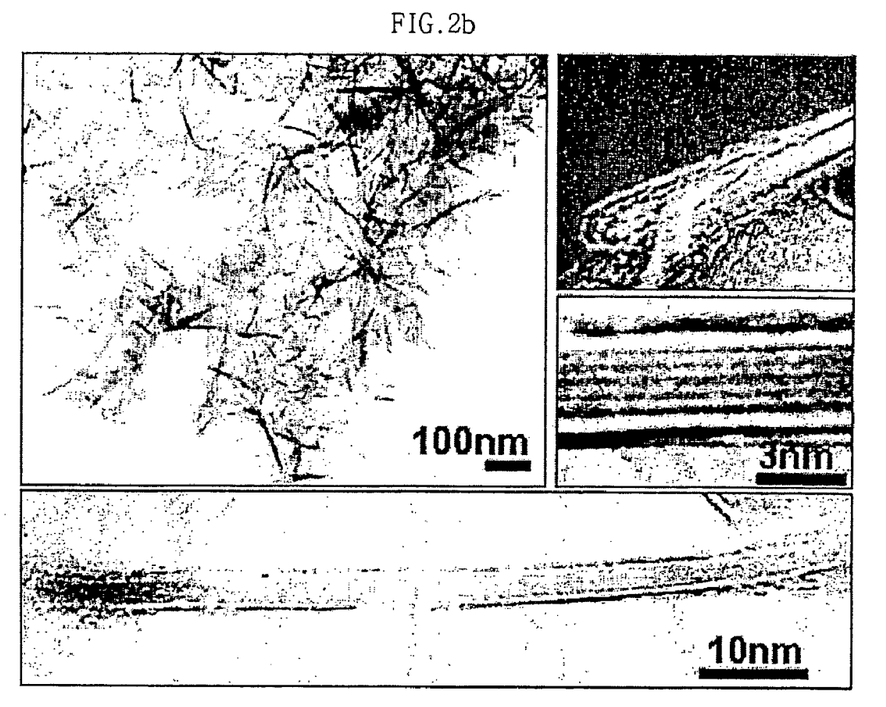

FIG. 2b represents TEM photographs of an alumina nanotube with lithium, produced according to Example 2-10 of the invention.

FIGS. 2a and 2b indicate that the alumina nanotube is composed of bundle of lower nanotubes and the structure was confirmed by molecular simulation.

Example 2-14

Production of Alumina Nanotube with Lithium

In producing an alumina nanotube with lithium, a lithium precursor may be added on to an already produced alumina nanotube by post-treatment.

First, a cationic surfactant ($CH_3(CH_2)_{n-1}N(CH_3)_3Br$, n=16) as a surfactant, aluminum tri-secondary-butoxide as aluminum precursor and water as a solvent were mixed together. The mole ratio was 0.5:1:2 for surfactant:aluminum precursor:water, respectively. After the mixture was stirred until a uniform mixture was obtained, the resulting solution was poured into a Teflon-lined autoclave container, and was subjected to hydrothermal reaction for 72 hours at 423K. Afterwards, the product was washed with ethanol several times, and then dried at 383K. Then, after 4 hours of calcinating process at 773K and at atmospheric pressure to remove any residual surfactant, an alumina nanotube was obtained.

To the alumina nanotube, lithium is added to create a derivative of alumina nanotube with added lithium as described below.

As a lithium precursor, $LiNO_3$ was used. In the already produced alumina nanotube, 0.5 wt % of $LiNO_3$ per 1 g of the alumina nanotube and 100 ml of water were added to allow ion exchange for 3 hours at a room temperature. The resulting product was filtered, washed with distilled water, and dried for 12 hours at 373K. The dried material was calcinated at 623K for 5 hours and at an air atmosphere for 2 hours. After the material reached 573K, it was treated with oxygen for 2 hours to obtain an alumina nanotube with added lithium seed.

In the resulting alumina nanotube with added lithium seed, 5 wt % of $LiNO_3$ was added again by an impregnation process followed by a calcinations process at 623K and at an air atmosphere to produce an alumina nanotube with lithium.

Figure 3:
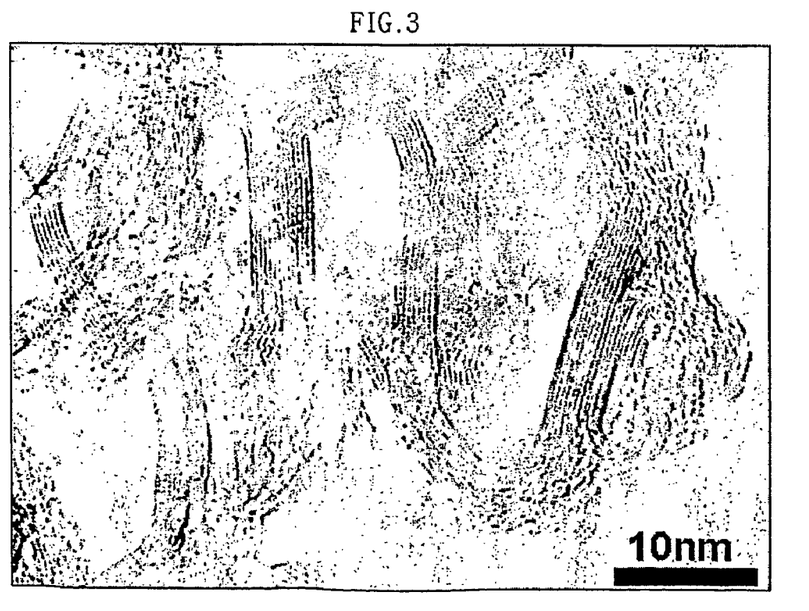
FIG. 3 is a TEM photograph of an alumina nanotube with lithium, produced according to Example 2-14 of the invention.

FIG. 3 depicts the TEM photograph of the alumina nanotube with lithium.

Example 2-15

Hydrogen Storage by Using Alumina Nanotube

In Example 2-10, hydrogen storage capacity was tested by using the alumina nanotube with lithium.

Figure 4:
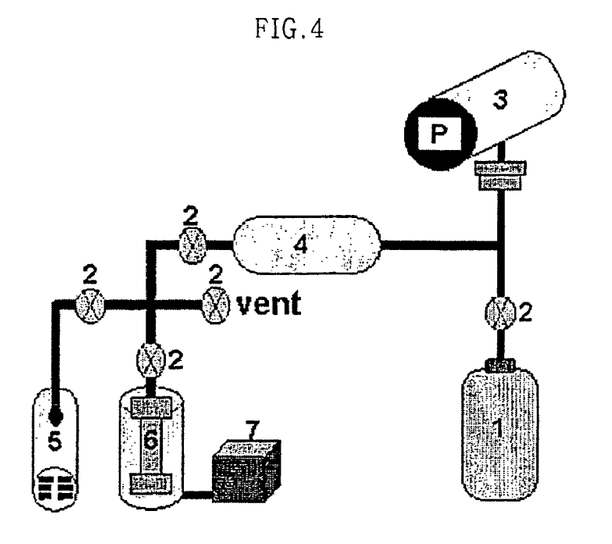
FIG. 4 represents a diagram for a constant volume system to test the hydrogen storage capacity of the alumina nanotube.

FIG. 4 illustrates schematical view of the equipment used to perform hydrogen storage experiments. The equipment is fixed volume equipment having a hydrogen gas storage container (4) (83.52 ml) and a sample container (6) (15.02 ml), where samples are to be added.

For hydrogen storage test, 0.1 g of alumina nanotube with lithium as produced by Example 2-10, is inserted in the sample container (6) of FIG. 4. Then, vacuum pump (5) was connected to the container and all other valves were closed. By using the vacuum pump, all foreign substances in the sample were discharged. For the process, by using temperature controller (7), the temperature of the electrical furnace was preheated to a range between 473K and 673K and then reduced to 298K-673K for the hydrogen storage test. After the temperature was set, all valves were closed, and then vacuum pump (5) was turned on.

After the temperature of the entire system was set to the appropriate hydrogen storage experiment temperature (298K-673K) and stabilized, the pressure control regulator was set to a constant pressure (2.7 atm). Afterwards, hydrogen storage container was filled with hydrogen, and when the pressure was stabilized, the reading on transmeter (3) was recorded. After recording readings at various pressures, the value of the pressure transmeter (3) was calibrated. Afterwards, it was confirmed that no gas escaped from the entire system.

For the hydrogen storage test, hydrogen with ultrahigh purity (99.999%) in predetermined pressure (2.7 atm) was injected into the hydrogen container (6). The readings on the pressure transmeter indicator were recorded with time.

Figure 5:
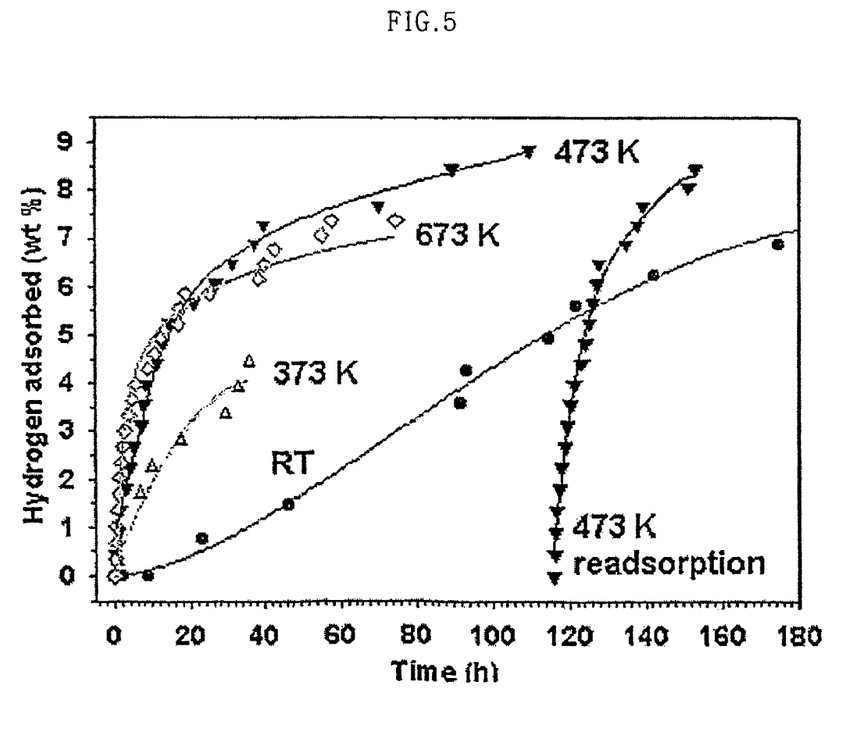
FIG. 5 is a graph depicting the result of hydrogen storage capacity experiments of the alumina nanotube with lithium produced in Example 10, under constant pressure (2.7 atmospheric pressure) but at different temperatures.

The amount of hydrogen absorbed in an alumina nanotube was assessed by the decreased value in the pressure. FIG. 5 shows the amount of hydrogen adsorbed under a constant pressure (2.7 atm) but at different temperatures. From FIG. 5, it can be inferred that the hydrogen adsorption speed and hydrogen storage capacity clearly increase with the increase in the temperature. At a temperature above 473K, the hydrogen storage capacity was similar for all samples (approximately 8.8 wt %).

Also, FIG. 5 shows that when hydrogen adsorbed (approx. 8.8 wt %) at 473K, was re-vacuumed at 673K to be detached and readsorption test was carried out, a smooth desorption and readsorption processes of hydrogen were possible.

Experimental Example

Figure 6:
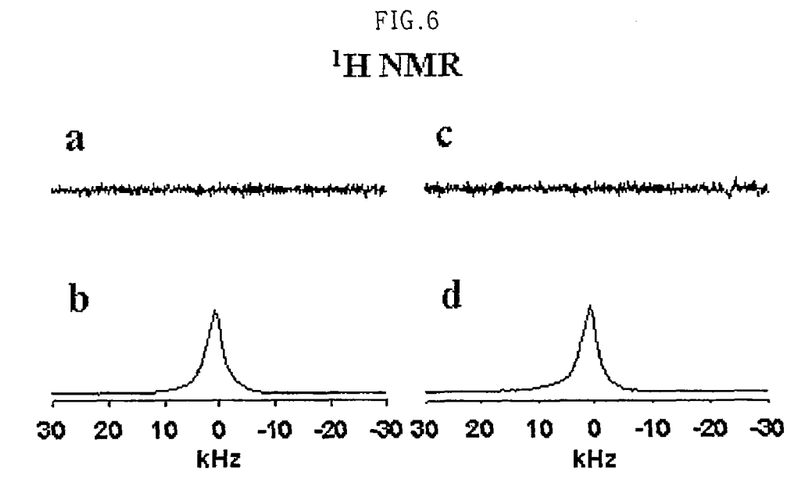
FIG. 6 depicts the results of $^1H$ NMR showing the adsorption and desorption of hydrogen at 2.7 atmospheric pressure and room temperature of the alumina nanotube with lithium produced in Example 10.

The adsorption and desorption processes of the hydrogen during hydrogen storage Experiment of 2-15 was confirmed by $^1H$ NMR and shown in FIG. 6.

"a" represents the result of $^1H$ NMR at room temperature, before hydrogen storage, but after vacuum treatment, which showed that there was no hydrogen adsorption. "b" represents the result of $^1H$ NMR after 45 hours of hydrogen storage test at room temperature and at 2.7 atmospheric pressure, which showed hydrogen adsorption. Afterwards, the adsorbed hydrogen was re-vacuumed and deabsorbed and $^1H$ NMR confirmed a complete desorbed as shown in "c." Then, "d" showed that the hydrogen readsorption had taken place.

The above examples and experimental examples show that the hydrogen storage capacity by the alumina nanotubes produced according to the present invention, even in a mild environment (temperature and pressure), the hydrogen storage efficiency (approximately 8.8 wt. %) was higher than other commonly used hydrogen storage materials and also showed smooth adsorption and desorption reactions. Accordingly, the alumina nanotube produced according to the invention is considered a safe and economical hydrogen storage medium.

Theoretically, the hydrogen storage capacity of a hydrogen storage unit using a metal hydride is considered to be high, depending on the type of the metal (e.g. 10.6 wt % for $LiAlH_2$). However, ordinarily, it is known that an actual metal hydride only shows approximately 5 wt. % of hydrogen storage capacity. Recently, there had been a report of high hydrogen storage capacity by using a carbon nanotube (approx. 20 wt. %). However many researchers are refuting the reproducibility of such result since most of other reports show approximately 5 wt % of hydrogen storage capacity at an extremely high pressure (approx. 100 atm). Therefore, a new hydrogen storage medium using the alumina nanotube of the present invention can be useful.

As discussed above, the alumina nanotube produced by the present invention has the following advantages: compared to other production of carbon materials having nano structures, alumina nanotube production is simple and produces large quantity; the absorption and de-absorption can be easily controlled by manipulating temperature and pressure during the use as a hydrogen storage material; the inner structure does not easily change form even after repeated adsorption—desorption reactions, thereby providing a structural stability; and by proven accuracy and reproducibility, it provides great use as clean hydrogen energy source.

The mesoporous alumina molecular sieve of the invention is produced by using a cationic surfactant without using traditionally used additives. Also, because the size and distribution of the pores can be controlled, the molecular sieve can be produced simply and economically, producing molecular sieve with high surface area and thermal stability.

Further, the alumina nanotube of the invention, can be mass-produced in a mild condition, compared to other commonly used methods of nanotube production. The alumina nanotube can be used as a hydrogen storage material since it can effectively store and safely transport comparatively large amount of hydrogen in a small volume. Further, it can be used in a lithium secondary battery.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of producing a mesoporous alumina molecular sieve, comprising:
   mixing a surfactant and an alumina precursor with an organic solvent to produce a mixture;
   adding water to the mixture;
   hydrothermal synthesizing the mixture with the added water; and
   drying and calcinating the mixture to remove residual surfactants, wherein the surfactant is a cationic surfactant represented by chemical formula 1 below:

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and x represents a halogen atom, acetate, phosphate, nitrate, or methylsulfate.

2. The method as claimed in claim 1, wherein the alumina precursor to water in mole ratio is 1:0.1 to 10.

3. The method as claimed in claim 2, wherein the alumina precursor to water in mole ratio is 1:1 to 3.

4. The method as claimed in claim 1, wherein the surfactant to water in mole ratio is 1:0.1 to 10.

5. The method as claimed in claim 1, wherein the alumina precursor is an aluminum alkoxide.

6. The method as claimed in claim 5, wherein the aluminum alkoxide is an aluminum-tri-butoxide or an aluminum isopropoxide.

7. The method as claimed in claim 1, wherein the organic solvent is an alcoholic-based solvent.

8. The method as claimed in claim 7, wherein the organic solvent is 1-butanol, 2-butanol, 1-propanol or 2-propanol.

9. The method as claimed in claim 1, wherein the hydrothermal reaction is carried out at 0 to 200° C. for 10 to 100 hours.

10. A method of producing alumina nanotube, comprising:
    mixing a surfactant and an alumina precursor to produce a mixture;
    adding water to the mixture;
    hydrothermal synthesizing the mixture with the added water; and
    drying and calcinating the mixture to remove residual surfactants.

11. The method as claimed in claim 10, wherein the alumina precursor to water in mole ratio is 1:0.1 to 10.

12. The method as claimed in claim 11, wherein the alumina precursor to water in mole ratio is 1:1 to 3.

13. The method as claimed in claim 10, wherein the surfactant to water in mole ratio is 1:0.1 to 10.

14. The method as claimed in claim 10, wherein the surfactant is a cationic surfactant of chemical formula 1 below, an anionic surfactant of chemical formula 2 below, a nonionic surfactant of chemical formula 3 below, or a neutral surfactant of chemical formula 4 below:

[Chemical Formula 1]

wherein $R_1$, to $R_3$ represent substituted or unsubstituted alkyl group with 1 to 4 carbon atoms, $R_4$ represents substituted or unsubstituted alkyl group with 8 to 22 carbon atoms, and x represents a halogen atom, acetate, phosphate, nitrate, or methylsulfate;

$R_5$—COOH    [Chemical Formula 2]

wherein $R_5$ represents substituted or unsubstituted alkyl group with 1 to 22 carbon atoms;

$$CH_3(CH_2)_{30}(CH_2CH_2O)_n\text{—}OH \qquad \text{[Chemical Formula 3]}$$

wherein n represents an integer of 1 to 30;

$$R_6\text{—}NH_2 \qquad \text{[Chemical Formula 4]}$$

wherein $R_6$ represents substituted or unsubstituted alkyl group with 8 to 22 carbon atoms.

15. The method as claimed in claim 10, wherein the alcoholic group of organic solvents is 1-butanol, 2-butanol, 1-propanol or 2-propanol.

16. The method as claimed in claim 10, wherein the hydrothermal reaction is carried out at 0 to 200° C. for 10 to 100 hours.

17. A method of producing alumina nanotube, comprising:
    mixing a surfactant and an alumina precursor with an organic solvent to produce a mixture;
    adding water to the mixture;
    hydrothermal synthesizing the mixture with the added water; and
    drying and calcinating the mixture to remove residual surfactants, and
    further comprising adding a lithium precursor during producing the mixture or after the calcinating process.

18. The method as claimed in claim 17, wherein the lithium precursor and water is added after the calcinating process and further drying and calcinating to produce an alumina nanotube with lithium, and again adding the lithium precursor by impregnation method followed by calcinating process.

19. The method as claimed in claim 17, wherein the lithium precursor is a lithium hydroxide, halide, nitrate, carbonate or sulfate.

20. The method as claimed in claim 17, wherein the alumina precursor to the lithium precursor mole fraction is 1:0.1 to 10.

21. The method as claimed in claim 17, wherein the alumina precursor to water mole fraction is 1:0.1 to 10.

22. The method as claimed in claim 17, wherein the alumina precursor to water mole ratio is 1:1 to 3.

23. The method as claimed in claim 17, wherein the surfactant to water mole ratio is 1:0.1 to 10.

24. The method as claimed in claim 17, wherein the surfactant is a cationic surfactant of chemical formula 1 below, an anionic surfactant of chemical formula 2 below, a nonionic surfactant of chemical formula 3 below, or a neutral surfactant of chemical formula 4 below:

[Chemical Formula 1]

wherein $R_1$ to $R_3$ represent substituted or unsubstituted alkyl group with 1 to 4 carbon atoms, $R_4$ represents substituted or unsubstituted alkyl group with 8 to 22 carbon atoms, and x represents a halogen atom, acetate, phosphate, nitrate, or methylsulfate;

$$R_5\text{—}COOH \qquad \text{[Chemical Formula 2]}$$

wherein $R_5$ represents substituted or unsubstituted alkyl group with 1 to 22 carbon atoms;

$$CH_3(CH_2)_{30}(CH_2CH_2O)_n\text{—}OH \qquad \text{[Chemical Formula 3]}$$

wherein n represents an integer of 1 to 30;

$$R_6\text{—}NH_2 \qquad \text{[Chemical Formula 4]}$$

wherein $R_6$ represents substituted or unsubstituted alkyl group with 8 to 22 carbon atoms.

25. The method as claimed in claim 17, wherein the aluminum precursor is a aluminum alkoxide.

26. The method as claimed in claim 17, wherein the hydrothermal reaction is carried out at 0 to 200° C. for 10 to 100 hours.

27. An alumina nanotube produced by the method of claim 10.

28. A hydrogen storage material produced by inducing absorption of hydrogen to the alumina nanotube of claim 27.

29. A hydrogen storage material of claim 28, wherein the absorption of hydrogen is carried out while maintaining temperature of a container holding the nanotube at 298K to 673K and maintaining the pressure of hydrogen gas at 1 to 10 atmospheric pressure.

30. The hydrogen storage material of claim 29, wherein the container holding the nanotube is vacuum treated at 373K to 773K prior to inducing hydrogen adsorption.

\* \* \* \* \*

UNITED STATES PATENT AND TRADEMARK OFFICE
CERTIFICATE OF CORRECTION

| | | |
|---|---|---|
| PATENT NO. | : 7,399,459 B2 | Page 1 of 1 |
| APPLICATION NO. | : 10/523804 | |
| DATED | : July 15, 2008 | |
| INVENTOR(S) | : Lee et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 116 days Delete the phrase "by 116 days" and insert -- by 236 days --

Signed and Sealed this

Eleventh Day of August, 2009

David J. Kappos
*Director of the United States Patent and Trademark Office*